(12) United States Patent
Matsumoto et al.

(10) Patent No.: US 8,739,251 B2
(45) Date of Patent: May 27, 2014

(54) APPARATUS AND METHOD FOR MANAGING ACCESS AMONG DEVICES

(75) Inventors: Yoshitaka Matsumoto, Yamato (JP);
Yoshihiko Terashita, Yamato (JP);
Hiroyuki Tanaka, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 13/447,010

(22) Filed: Apr. 13, 2012

(65) Prior Publication Data
US 2012/0198523 A1    Aug. 2, 2012

Related U.S. Application Data

(63) Continuation of application No. 12/502,193, filed on Jul. 13, 2009, now Pat. No. 8,201,225.

(30) Foreign Application Priority Data

Jul. 14, 2008  (JP) ................................. 2008-182877

(51) Int. Cl.
*H04L 29/06* (2006.01)
*G06F 7/04* (2006.01)

(52) U.S. Cl.
USPC .............. 726/4; 726/5; 726/6; 726/7; 726/27; 726/28; 726/29; 726/30

(58) Field of Classification Search
USPC .......................................................... 726/4
See application file for complete search history.

(56) References Cited

U.S. PATENT DOCUMENTS

| 7,103,653 | B2 * | 9/2006 | Iwatani .......................... 709/223 |
| 7,117,141 | B2 | 10/2006 | Kaji et al. |
| 7,769,952 | B2 * | 8/2010 | Hashimoto et al. ........... 711/129 |
| 8,201,225 | B2 | 6/2012 | Matsumoto et al. |

(Continued)

FOREIGN PATENT DOCUMENTS

| JP | 2002063063 | 2/2002 |
| JP | 2003345518 | 12/2003 |
| JP | 2006228078 | 8/2006 |

OTHER PUBLICATIONS

Notice of Allowance dated Oct. 30, 2010, pp. 1-19, for U.S. Appl. No. 13/450,376, filed by inventor Yoshitaka Matsumoto et al.

(Continued)

*Primary Examiner* — Longbit Chai
(74) *Attorney, Agent, or Firm* — Konrad Raynes Davda & Victor LLP; David W. Victor

(57) ABSTRACT

Provided are a method, system, and computer storage device for managing zone information for devices in a network. A zone table includes entries indicating whether devices in at least one zone are permitted to communicate. An attributes table has attributes of the devices indicated in the zone table. A determination is made of attributes from the attributes table for devices indicated in the zone table entries as being permitted to communicate. The entries in the zone table indicating that devices can communicate are verified by determining whether the attributes for the devices indicated as permitted to communicate in the entries in the zone table are consistent with the determined devices being able to communicate. Information is outputted indicating whether the entries in the zone table indicating that devices can communicate are in error.

24 Claims, 12 Drawing Sheets

(56) References Cited

U.S. PATENT DOCUMENTS

| | | |
|---|---|---|
| 2003/0225934 A1 | 12/2003 | Kaji et al. |
| 2006/0190611 A1 | 8/2006 | Miyazaki et al. |
| 2012/0022170 A1 | 1/2012 | Bunick et al. |
| 2012/0221704 A1 | 8/2012 | Matsumoto et al. |

OTHER PUBLICATIONS

Information Materials for IDS, dated Feb. 13, 2013, pp. 1-2.
Notice of Allowance, dated Oct. 30, 2012, for U.S. Appl. No. 13/450,376, filed Apr. 18, 2012, entitled, "Apparatus and Method for Managing Access Among Devices", invented by Yoshitaka Matsumoto et al., pp. 1-19.
Machine Translation for JP2006228078, published Aug. 31, 2006, pp. 1-48.
Patent abstract for JP2002-063063, published on Feb. 28, 2002, 1 pg.
Machine translation for JP2002-063063, published Feb. 28, 2002, 22 pgs.
Notice of Allowance dated Jan. 25, 2010, pp. 1-15, for U.S. Appl. No. 12/502,193, filed Jul. 13, 2007, by inventors Yoshitaka Matsumoto et al.

* cited by examiner

|       | Blade1 | Disk1 | Disk2 |
|-------|--------|-------|-------|
| Blade1 |        | OK    | OK    |
| Disk1  | OK     |       |       |
| Disk2  | OK     |       |       |

(b)

|        | Initiator | Target |
|--------|-----------|--------|
| Blade1 | OK        |        |
| Disk1  |           | OK     |
| Disk2  |           | OK     |

(c)

|       | Blade1 | Disk1 | Disk2 |
|-------|--------|-------|-------|
| Blade1 |        | OK    | OK    |
| Disk1  | OK     |       |       |
| Disk2  | OK     |       |       |

|       | Blade1 | Disk1 | Disk2 |
|-------|--------|-------|-------|
| Blade1|        | OK    | OK    |
| Disk1 | OK     |       |       |
| Disk2 | OK     |       |       |

(b)

|       | Initiator | Target |
|-------|-----------|--------|
| Blade1| OK        |        |
| Disk1 | OK        | OK     |
| Disk2 | OK        | OK     |

(c)

|       | Blade1 | Disk1 | Disk2 |
|-------|--------|-------|-------|
| Blade1|        | OK    | OK    |
| Disk1 | OK     |       | OK    |
| Disk2 | OK     | OK    |       |

|      | ZGID1 | ZGID2 | ZGID3 | ZGID4 |
|------|-------|-------|-------|-------|
| ZGID1 | OK   |       | OK    |       |
| ZGID2 |      |       |       | OK    |
| ZGID3 | OK   |       |       |       |
| ZGID4 |      | OK    |       |       |

(b)

| Zone Group ID 1 | Blade1-3<br>Storage Module 1 Disk 1-3<br>RAID Controller |
|-----------------|----------------------------------------------------------|
| Zone Group ID 2 | Blade4-6                                                 |
| Zone Group ID 3 | Storage Module 1 Disk 4-6                                |
| Zone Group ID 4 | Storage Module 2 Disk 1-6                                |

(c)

|      | Initiator | Target |
|------|-----------|--------|
| ZGID1 | OK       | OK     |
| ZGID2 | OK       |        |
| ZGID3 |          | OK     |
| ZGID4 |          | OK     |

(d)

| Zone Group ID 1 | Blade1-3                  |
| Zone Group ID 2 | Blade4-6                  |
| Zone Group ID 3 | Storage Module 1 Disk 4-6 |
| Zone Group ID 4 | Storage Module 2 Disk 1-6 |
| Zone Group ID 5 | Storage Module 1 Disk 1-3 |
| Zone Group ID 6 | RAID Controller           |

|      | ZGID1 | ZGID2 | ZGID3 | ZGID4 |
|------|-------|-------|-------|-------|
| ZGID1 |      |       | OK    | OK    |
| ZGID2 |      |       | OK    | OK    |
| ZGID3 | OK   | OK    |       |       |
| ZGID4 | OK   | OK    |       |       |

(b)

| Zone Group ID 1 | Blade1-3 |
|-----------------|----------|
| Zone Group ID 2 | Blade4-6 |
| Zone Group ID 3 | Storage Module 1 Disk 1-6 |
| Zone Group ID 4 | Storage Module 2 Disk 1-6 |

(c)

|       | Initiator | Target |
|-------|-----------|--------|
| ZGID1 | OK        |        |
| ZGID2 | OK        |        |
| ZGID3 |           | OK     |
| ZGID4 |           | OK     |

(d)

| Zone Group ID 1 | Blade1-6 |
|-----------------|----------|
| Zone Group ID 3 | Storage Module 1 Disk 1-6<br>Storage Module 2 Disk 1-6 |

|  | ZGID1 | ZGID2 | ZGID3 | ZGID4 |
|---|---|---|---|---|
| ZGID1 |  |  | OK |  |
| ZGID2 |  |  |  | OK |
| ZGID3 | OK |  |  |  |
| ZGID4 |  | OK |  |  |

(b)

|  | Initiator | Target |
|---|---|---|
| ZGID1 | OK |  |
| ZGID2 | OK |  |
| ZGID3 |  | OK |
| ZGID4 |  | OK |

(c)

|  | ZGID1 | ZGID2 | ZGID3 | ZGID4 |
|---|---|---|---|---|
| ZGID1 |  |  | OK |  |
| ZGID2 |  |  |  | OK |
| ZGID3 | OK |  |  |  |
| ZGID4 |  | OK |  |  |

|  | ZGID1 | ZGID2 | ZGID3 | ZGID4 |
|---|---|---|---|---|
| ZGID1 |  |  | OK |  |
| ZGID2 |  |  |  | OK |
| ZGID3 | OK |  |  |  |
| ZGID4 |  | OK |  |  |

(b)

|  | Initiator | Target |
|---|---|---|
| ZGID1 | OK |  |
| ZGID2 | OK |  |
| ZGID3 | OK | OK |
| ZGID4 |  | OK |

(c)

|  | ZGID1 | ZGID2 | ZGID3 | ZGID4 |
|---|---|---|---|---|
| ZGID1 |  |  | OK |  |
| ZGID2 |  |  |  | OK |
| ZGID3 | OK |  | OK | OK |
| ZGID4 |  | OK | OK |  |

APPARATUS AND METHOD FOR
MANAGING ACCESS AMONG DEVICES

CROSS-REFERENCE TO RELATED FOREIGN
AND DOMESTIC APPLICATIONS

This application is a continuation of U.S. patent application Ser. No. 12/502,193, filed on Jul. 13, 2009, which is a non-provisional application that claims priority benefits under Title 35, Unites States Code, Section 119(a)-(d) from Japanese patent application entitled "APPARATUS AND METHOD FOR MANAGING ACCESS AMONG DEVICES" by Yoshitaka Matsumoto, Yoshihiko Terashita, and Hiroyuki Tanaka, having Japanese Patent Application Serial No. 2008-182877, filed on Jul. 14, 2008, which U.S. patent application and Japanese patent application are incorporated herein by reference in its entirety.

BACKGROUND

1. Field of the Invention

The present invention relates to an apparatus and method for managing access among the devices. More particularly, the invention relates to an apparatus and method for managing access among a plurality of devices accommodated in one chassis.

2. Related Art

In recent years, the server has a lower price, and each enterprise can introduce the server relatively simply. Accordingly, each enterprise possesses a number of servers, whereby there is a growing demand for lower operation management cost of the server and space saving. Thus, the number of companies introducing a blade server system as the product for meeting such demand has grown. The blade server system is the system in which a plurality of servers or devices such as a storage are arranged at high density in one chassis (chassis).

By the way, in such system in which the plurality of servers or devices such as a storage are arranged in one chassis, the data integrity may not be ensured if the access control between these devices is appropriately performed. For example, supposing that immediately after a certain server reads data in a storage, another server overwrites data in the same storage, the data integrity may not be ensured. To avoid such a situation, the blade server system generally has a zoning function. Nowadays, an SAS (Serial Attached SCSI) has become the mainstream as the next generation interface for a SCSI (Small Computer System Interface), and the zoning specifications are defined in Serial Attached SCSI-2 (SAS-2) Standard Working Draft.

In this zoning function, whether access is permitted among the SAS devices such as an SAS host bus adaptor (SAS HBA) on the blade server, a disk drive module (DDM) in the blade server system, and a RAID sub-system or SAS HBA connected to an external port in the same blade server system is decided based on a zone permission table. It is required that the setting of the zone permission table is made by the administrator, but it is very inefficient that all the zonings are manually set, easily causing a mistake.

Thus, some of the blade server systems mount a function of incorporating several kinds of zoning settings supposedly having high use frequency as the preliminary definitions to reduce a trouble or mistake in setting the zoning as much as possible.

Herein, conventionally there are various techniques for the zoning setting (e.g., refer to Japanese Patent Publication No. 2002-063063, published Feb. 28, 2002). In Japanese Patent Publication No. 2002-063063, an area in the storage device to access from the host side and a fiber channel adaptor (FCA) and a host bus adaptor (HBA) for use in gaining access to the storage device are set up in the integrated storage controls for integrally controlling the SAN, and the integrated storage controls make the storage setting, the zoning setting and the setting of the area to which access is permitted to an SAN management component of the host, a zoning setting component of the switch and a storage management component of the storage device, based on this information.

BRIEF DESCRIPTION OF THE DRAWINGS

FIG. 4 is a view showing the examples of the table for use in a first operation example of a validity verification process according to the embodiment of the invention;

FIG. 5 is a view showing the examples of the table for use in the first operation example of the validity verification process according to the embodiment of the invention;

FIG. 7 is a view showing the examples of the table for use in a division verification process in a second operation example of the validity verification process according to the embodiment of the invention;

FIG. 9 is a view showing the examples of the table for use in a merge verification process in the second operation example of the validity verification process according to the embodiment of the invention;

FIG. 11 is a view showing the examples of the table for use in a permission verification process in the second operation example of the validity verification process according to the embodiment of the invention; and FIG. 12 is a view showing the examples of the table for use in the permission verification process in the second operation example of the validity verification process according to the embodiment of the invention.

SUMMARY

Figure 1:
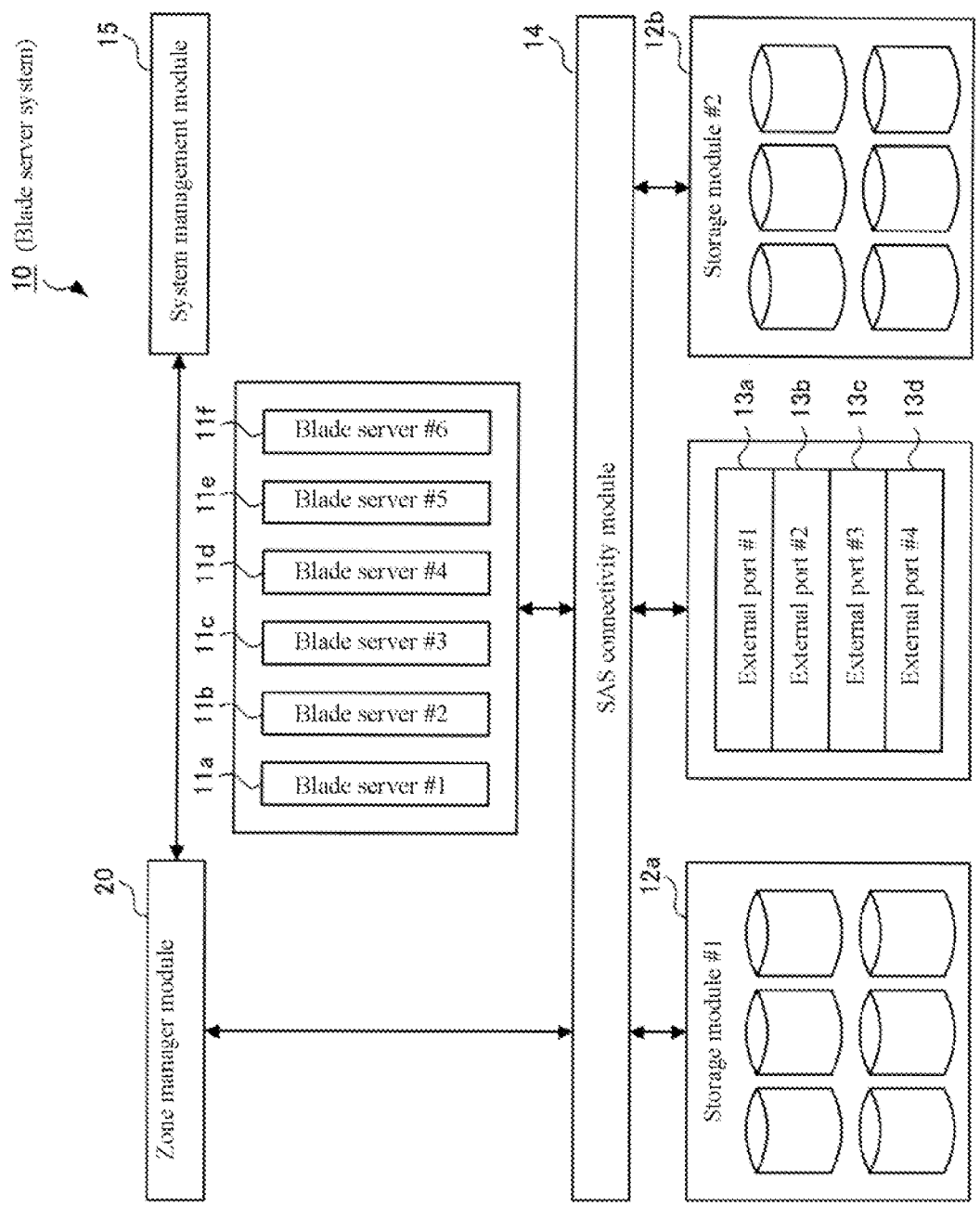
FIG. 1 is a diagram showing the overall configuration of a blade server system according to an embodiment of the present invention.

Provided are a method, system, and computer storage device for managing zone information for devices in a network. A zone table includes entries indicating whether devices in at least one zone are permitted to communicate. An attributes table has attributes of the devices indicated in the zone table. A determination is made of attributes from the attributes table for devices indicated in the zone table entries as being permitted to communicate. The entries in the zone table indicating that devices can communicate are verified by determining whether the attributes for the devices indicated as permitted to communicate in the entries in the zone table are consistent with the determined devices being able to communicate. Information is outputted indicating whether the entries in the zone table indicating that devices can communicate are in error.

DETAILED DESCRIPTION

In this way, described embodiments seek to reduce the trouble and mistake of setting the zoning as much as possible in a blade server system.

However, with the method for incorporating several kinds of zoning settings supposedly having high use frequency as the preliminary definitions as described above, a fixed zone permission table is used, whereby there is a great deal of room for further improvement, considering a case where the user wants to set a complex zone permission table. Some products at present require the setting of 128 rows×128 columns in the zone permission table, but there may be a need to expand the number of rows and the number of columns in the future.

It should be noted that the technique of Japanese Patent Publication No. 2002-063063 involves setting the zoning but does not reduce the trouble or mistake of setting the zoning.

It is an object of the embodiments to reduce the trouble and mistake in making the setting on access among a plurality of management units.

In order to accomplish the above object, the embodiments provide an apparatus for managing access among a plurality of devices accommodated in a chassis, comprising an acceptance part for accepting setting information by the user on access between a first management unit including at least one device of the plurality of devices and a second management unit including at least one device of the plurality of devices, an acquisition part for acquiring the first attribute information designating at least any one of an instruction issuing function and an instruction receiving function among the functions of the first management unit and the second attribute information designating at least any one of the instruction issuing function and the instruction receiving function among the functions of the second management unit, a determination part for determining whether or not the setting information accepted by the acceptance part is consistent with a combination of the first attribute information and the second attribute information acquired by the acquisition part, and an output part for outputting information based on a determination result of the determination part.

The setting information may include the setting of permitting access between the first management unit and the second management unit, and the output part may output information designating that the setting is erroneous, if the determination part determines that the setting information and the combination are inconsistent. In this case, the determination part may determine that the setting information and the combination are inconsistent, in any one of the case where both the first attribute information and the second attribute information designate the instruction issuing function and do not designate the instruction receiving function and the case where both the first attribute information and the second attribute information designate the instruction receiving function and do not designate the instruction issuing function.

Also, the setting information may include the setting of not permitting access between the first management unit and the second management unit, and the output part may output information designating that the setting is changeable, if the determination part determines that the setting information and the combination are inconsistent. In this case, the determination part may determine that the setting information and the combination are inconsistent, if one of the first attribute information and the second attribute information designates the instruction issuing function and the other designates the instruction receiving function. Also, the determination part may determine that the setting information and the combination are inconsistent, if one of the first attribute information and the second attribute information designates the instruction issuing function and the instruction receiving function and the other designates the instruction receiving function.

Further, the first management unit may comprise a plurality of devices, and the output part may output information designating that a management unit comprising some of the devices can be divided from the first management unit, in at least any one of the case where some of the devices included in the first management unit have the instruction issuing function and do not have the instruction receiving function, and the case where some of the devices included in the first management unit have the instruction receiving function and do not have the instruction issuing function.

Furthermore, the output part may output information designating that the first management unit and the second management unit can be merged, in at least any one of the case where the setting information includes the setting of permitting access between the first management unit and the other management unit having the instruction receiving function and permitting access between the second management unit and the other management unit, and both the first attribute information and the second attribute information designate the instruction issuing function and do not designate the instruction receiving function, and the case where the setting information includes the setting of permitting access between the first management unit and the other management unit having the instruction issuing function and permitting access between the second management unit and the other management unit, and both the first attribute information and the second attribute information designate the instruction receiving function and do not designate the instruction issuing function.

Further embodiments provide an apparatus for managing access among a plurality of devices accommodated in a chassis, comprising an acceptance part for accepting setting information by the user on access between a first management unit including at least one device of the plurality of devices and a second management unit including at least one device of the plurality of devices, an acquisition part for acquiring the first attribute information designating at least any one of an instruction issuing function and an instruction receiving function among the functions of the first management unit and the second attribute information designating at least any one of the instruction issuing function and the instruction receiving function among the functions of the second management unit, a determination part for determining that the setting information accepted by the acceptance part is inconsistent with a combination of the first attribute information and the second attribute information acquired by the acquisition part, if the setting information includes the setting of not permitting access between the first management unit and the second management unit, the setting of permitting access between the first management unit and the management unit having the instruction issuing function, and the setting of permitting access between the second management unit and the management unit having the instruction issuing function, and one of the first attribute information and the second attribute information designates the instruction issuing function and the instruction receiving function, the other designating the instruction receiving function, and an output part for outputting information designating that the settings are changeable, if the determination part determines that the setting information is inconsistent with the combination.

Further embodiments provide a system composed of a plurality of apparatuses accommodated in a chassis, comprising a first apparatus having an instruction issuing function, a second apparatus having an instruction receiving function, a determination apparatus for determining whether or not the setting information by the user on access between a first management unit including the first apparatus and a second management unit including the second apparatus is consistent with a combination of the first attribute information designating whether the first management unit has the instruction issuing function or the instruction receiving function and the second attribute information designating whether the second management unit has the instruction issuing function or the instruction receiving function, and an output apparatus for outputting information based on a determination result of the determination apparatus.

Further embodiments provide a method for managing access among a plurality of devices accommodated in a chassis, comprising accepting setting information by the user on access between a first management unit including at least one device of the plurality of devices and a second management unit including at least one device of the plurality of devices, acquiring the first attribute information designating at least any one of an instruction issuing function and an instruction receiving function among the functions of the first management unit and the second attribute information designating at least any one of the instruction issuing function and the instruction receiving function among the functions of the second management unit, determining whether or not the setting information is consistent with a combination of the first attribute information and the second attribute information, and outputting information based on a determination result of the determination.

With the described embodiments, it is possible to reduce the trouble and mistake of settings on access among the plurality of management units.

The embodiments will be described below in detail with reference to the accompanying drawings.

Further, a blade server system to which the embodiments apply will be described below.

FIG. 1 is a diagram showing a hardware configuration example of this blade server system 10. The blade server system 10 comprises the blade servers 11a to 11f, the storage modules 12a and 12b, and the external ports 13a to 13d, as shown in FIG. 1. Also, the blade server system 10 further comprises an SAS connectivity module 14, a system management module 15 and a zone manager module 20.

Each of the blade servers 11a to 11f is a server shaped like a blade, each blade comprising the components such as a microprocessor, a memory, a network controller and a hard disk drive. Each of the blade servers 11a to 11f is mounted in a blade server bay, but can be removed. In FIG. 1, six blade servers 11a to 11f are illustrated, but the number of blade servers is not necessarily limited to six. It should be noted that if it is not required to distinguish the blade servers 11a to 11f, they are also simply referred to as "blade server 11". Each of the storage modules 12a and 12b comprises six 3.5 type hard disk drives, for example, and functions as storage means for storing various kinds of data. Each of the storage modules 12a and 12b is mounted on the storage module bay, but can be removed. In FIG. 1, two storage modules 12a and 12b are illustrated, but the number of storage modules is not necessarily limited to two. It should be noted that if it is not required to distinguish the storage modules 12a and 12b, they are also simply referred to as "storage module 12".

Each of the external ports 13a to 13d is the external port on the SAS connectivity module 14 as will be described later. A RAID controller, for example, can be connected to each of the external ports 13a to 13b. In FIG. 1, four external ports 13a to 13d are illustrated, but the number of external ports is not necessarily limited to four. It should be noted that if it is not required to distinguish the external ports 13a to 13d, they are also simply referred to as "external port 13".

The SAS connectivity module 14 manages the connection between the SAS devices such as the blade servers 11a to 11f, the hard disk drives in the storage modules 12a and 12b, and the RAID controller, for example, connected to the external ports 13a to 13d. More specifically, the SAS connectivity module 14 has a zone permission table (hereinafter referred to as a "ZP table"), and performs the SAS zoning based on the settings in the ZP table. The SAS connectivity module 14 is mounted in an I/O module bay 3 or 4, but can be removed.

The system management module 15 is the module for providing a connection function with a network, and functioning as a user interface.

The zone manager module 20 verifies the validity of the ZP table generated based on setting information received from the system management module 15 based on the attribute of the SAS device port (hereinafter simply referred to as a "port") received from the SAS connectivity module 14.

That is, in this embodiment, the zone manager module 20 verifies the validity of access between the ports set in the ZP table based on the attribute of port, and automatically discriminates the optimal ZP table.

More specifically, the optimal ZP table is discriminated in accordance with the following procedure.

First, the zone manager module 20 determines whether the attribute of port is initiator or target, or the attribute can become initiator and target, and generates an initiator/target table (hereinafter referred to as an "I/T table") based on this determination result. Herein, an initiator is the attribute of device that issues an instruction to other devices connected by the SAS. A target is the attribute of device that receives an instruction from other devices having the attribute of initiator. Also, the attribute that can become the initiator and target is hereinafter denoted as "initiator/target".

Next, the zone manager module 20 verifies the validity of setting in the ZP table based on the attribute of the SAS device port. And the zone manager module 20 raises a warning or recommendation interactively to support the user on the setting operation of the ZP table. In this support, the kind of device (server, disk, RAID controller, etc.), namely, the attribute of port is used as auxiliary. For example, the priority of recommendation is adjusted based on the attribute of port. Also, if the attribute of port is RAID controller, the priority of recommendation is increased using a knowledge base, because a backup agent function is provided at high possibility.

In the SAS2 zoning, a plurality of ports can be included in one zone group ID (hereinafter referred to as a "ZGID"). Accordingly, the assignment of ZGID and port is made one-to-one, or 1-to-N. It is only supposed that the assignment of ZGID and port is made one-to-one in the above description of FIG. 1, but if the assignment of ZGID and port is made 1-to-N, it is necessary that the port is replaced with ZGID. That is, if the assignment of ZGID and port is made one-to-one, the port is used as one example of a first management unit and a second management unit including at least one device of a plurality of devices in this embodiment. Also, if the assignment of ZGID and port is made 1-to-N, ZGID is used as one example of the first management unit and the second management unit including at least one device of the plurality of devices.

Also, a method of generating the I/T table is different depending on whether the assignment is made one-to-one or 1-to-N.

Further, if the assignment of ZGID and port is 1-to-N, the port to be included in the same ZGID is obtained for recommendation.

Though the zone manager module 20 is configured independently from the SAS connectivity module 14 in this embodiment, the zone manager module 20 and the SAS connectivity module 14 may be configured as integral.

The functional configuration of the zone manager module 20 for performing the above operation will be described below.

Figure 2:
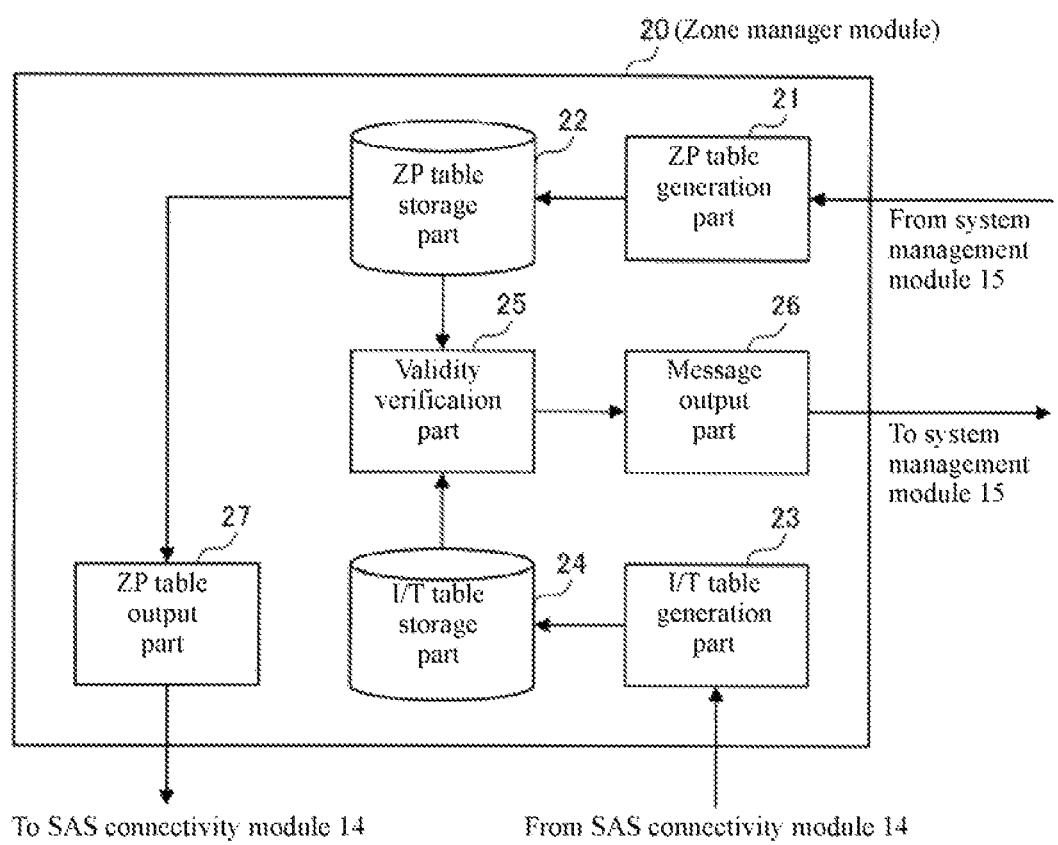
FIG. 2 is a diagram showing a functional configuration example of a zone management module according to the embodiment of the invention.

FIG. 2 is a block diagram showing a functional configuration example of the zone manager module 20.

The zone manager module 20 comprises a ZP table generation part 21, a ZP table storage part 22, an I/T table generation part 23, an I/T table storage part 24, a validity verification part 25, a message output part 26 and a ZP table output part 27, as shown in FIG. 2.

The ZP table generation part 21 receives the setting information regarding access permission between the SAS devices or between the ZGIDs from the system management module 15, and generates a ZP table storing the setting information. In this embodiment, as one example of the acceptance part for accepting the setting information by the user, the ZP table generation part 21 is provided.

The ZP table storage part 22 stores the ZP table generated by the ZP table generation part 21.

The I/T table generation part 23 receives an attribute of port from the SAS connectivity module 14, and generates an I/T table storing which the attribute of each port or each ZGID is, initiator, target or both, based on the attribute of port. In this embodiment, as one example of the acquisition part for acquiring the attribute information, the I/T table generation part 23 is provided.

The I/T table storage part 24 stores the I/T table generated by the I/T table generation part 23.

The validity verification part 25 verifies the validity of a setting in the ZP table stored in the ZP table storage part 22 by referring to the I/T table stored in the I/T table storage part 24. In this embodiment, as one example of the determination part for determining whether or not the setting information is consistent with the combination of attribute information, the validity verification part 25 is provided.

The message output part 26 outputs a message indicating the verification result of the validity verification part 25 to the system management module 15. In this embodiment, as one example of the output part for outputting the information based on the determination result, the message output part 26 is provided.

The ZP table output part 27 applies the ZP table by notifying the ZP table stored in the ZP table storage part 22 to the SAS connectivity module 14.

The operation of the zone manager module 20 will be described below in detail.

Herein, there are two cases where the assignment of ZGID and port is made one-to-one and 1-to-N, as described above. Thus, the former will be described as a first operation example and the latter as a second operation example.

Figure 3:
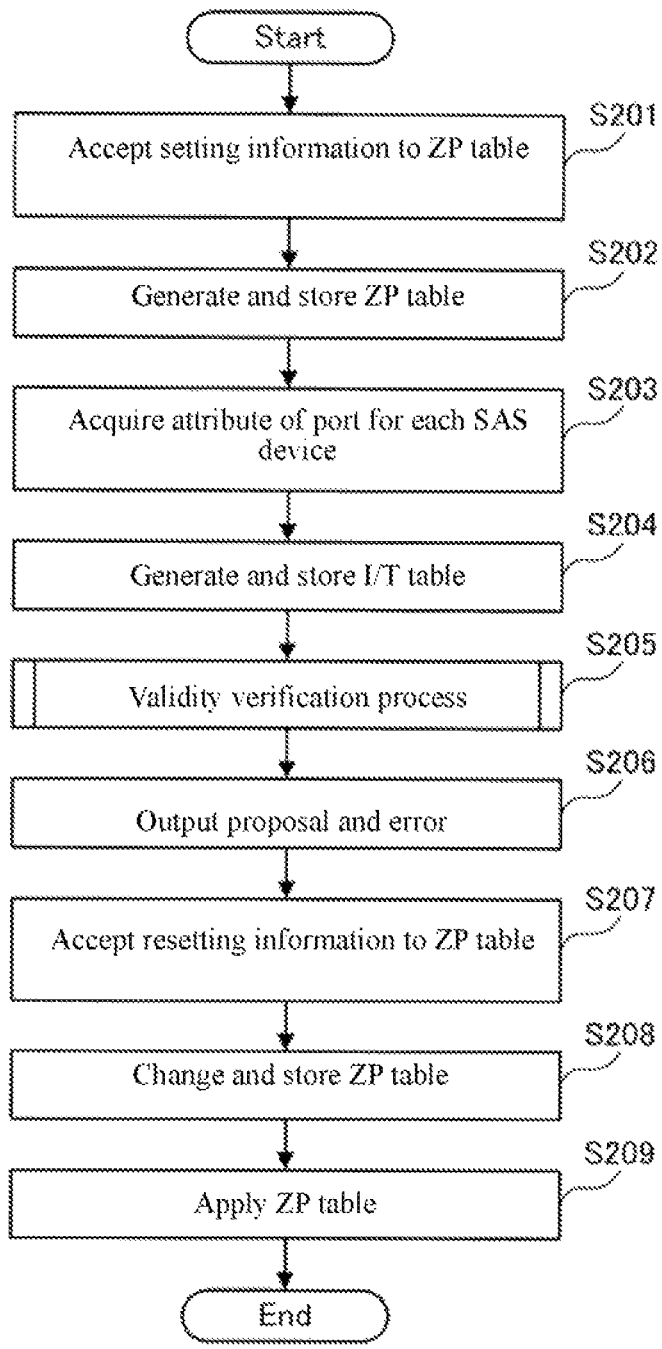
FIG. 3 is a flowchart showing an overall operation example of the zone management module according to the embodiment of the invention.

FIG. 3 is a flowchart showing the main flow of the zone manager module 20 in the first operation example.

If the user inputs the setting information for the ZP table via the system management module 15 in conventional manner, the ZP table generation part 21 in the zone manager module 20 accepts the input setting information (step 201). And the ZP table in which information based on the setting information is set is generated and stored in the ZP table storage part 22 (step 202).

Then, the I/T table generation part 23 acquires the attribute of port for the SAS device via the SAS connectivity module 14 from each SAS device (step 203). The SAS device may be any of the devices mounted on the blade server system 10, or only the devices included in the ZP table. Also, there are three kinds of the attribute of port, initiator, target and initiator/target, as described above. And the I/T table generation part 23 generates the I/T table, based on the attribute of port for the SAS device, and stores it in the I/T table storage part 24 (step 204). The I/T table is the table setting which the attribute of port for each SAS device is, initiator, target or initiator/target.

Thereafter, the validity verification part 25 verifies the validity of setting in the ZP table stored in the ZP table storage part 22 by referring to the I/T table stored in the I/T table storage part 24 (step 205).

If there is room for improvement or a setting error in the ZP table stored in the ZP table storage part 22, the message output part 26 makes a proposal for reform plan for the ZP table set by the user or notification of an error via the system management module 15 to the user (step 206).

The user takes an appropriate action to the proposal or error notification. That is, the user inputs the reset information for the ZP table. Then, the ZP table generation part 21 accepts the input reset information (step 207). And the ZP table stored in the ZP table storage part 22 is changed based on the reset information and the ZP table after change is stored in the ZP table storage part 22 (step 208).

As a result, the ZP table stored in the ZP table storage part 22 gets rid of the setting error, whereby the ZP table has no room for improvement, or becomes in a state undesired by the user even though there is room for improvement. Then, the ZP table output part 27 notifies the ZP table stored in the ZP table storage part 22 to the SAS connectivity module 14 (step 209). The finally decided ZP table is subsequently applied on access between the SAS devices.

A process in accordance with the flowchart of FIG. 3 will be specifically described below.

At first, a case where the attribute of port is initiator or target will be described below.

FIG. 4 is a view showing the examples of the table generated in this case.

First, the user sets the ZP table, and the ZP table generation part 21 stores the ZP table in the ZP table storage part 22 at step 202. The user may set the ZP table as shown in FIG. 4(*a*). In the first operation example, identification information of the SAS device is set in the row and column of the ZP table. The "OK" in the table indicates that access between corresponding SAS devices is permitted.

Also, the I/T table generation part 23 creates the I/T table and stores it in the I/T table storage part 24 at step 204. Since the attribute of port is initiator or target in this example, the I/T table as shown in FIG. 4(*b*) is created. That is, the attribute of port for Blade1 is set as initiator, and the attribute of port for Disk1 and Disk2 is set as target.

The validity verification part 25 performs a validity verification process based on the ZP table as shown in FIG. 4(*a*) and the I/T table as shown in FIG. 4(*b*) at step 205. In this validity verification process, information on accessibility to any other combination than the combination of SAS devices to which the user sets "OK" in the ZP table can be automatically generated. Since it is implicitly known that the data output destination of Blade1 is Disk1 and Disk2, with a server to disk configuration, from the I/T table of FIG. 4(b), the settings are unchanged as shown in FIG. 4(c).

Secondly, a case where the attribute of port is initiator, target or initiator/target will be described below.

FIG. 5 is a view showing the examples of the table generated in this case.

First, the user sets the ZP table, and the ZP table generation part 21 stores the ZP table in the ZP table storage part 22 at step 202. The user may set the ZP table as shown in FIG. 5(a). This is the same as shown in FIG. 4(a). The "OK" in the table indicates that access between corresponding SAS devices is permitted.

Also, the I/T table generation part 23 creates the I/T table and stores it in the I/T table storage part 24 at step 204. Since the attribute of port is initiator, target or initiator/target in this example, the I/T table as shown in FIG. 5(b) is created. That is, the attribute of port for Blade1 is set as initiator, and the attribute of port for Disk1 and Disk2 is set as initiator/target.

Thereafter, the validity verification part 25 performs a validity verification process based on the ZP table as shown in FIG. 5(a) and the I/T table as shown in FIG. 5(b) at step 205. In this validity verification process, information on accessibility to any other combination than the combination of SAS devices to which the user sets "OK" in the ZP table can be automatically generated. Herein, distinctively, both Disk1 and Disk2 can become initiator, and the system possibly takes synchronization between Disk 1 and Disk2. Accordingly, it is possible to propose to the user that access between Disk1 and Disk2 is permitted to improve performance as shown in FIG. 5(c).

Next, the validity verification process by the validity verification part 25 at step 205 will be described below in detail.

Figure 6:
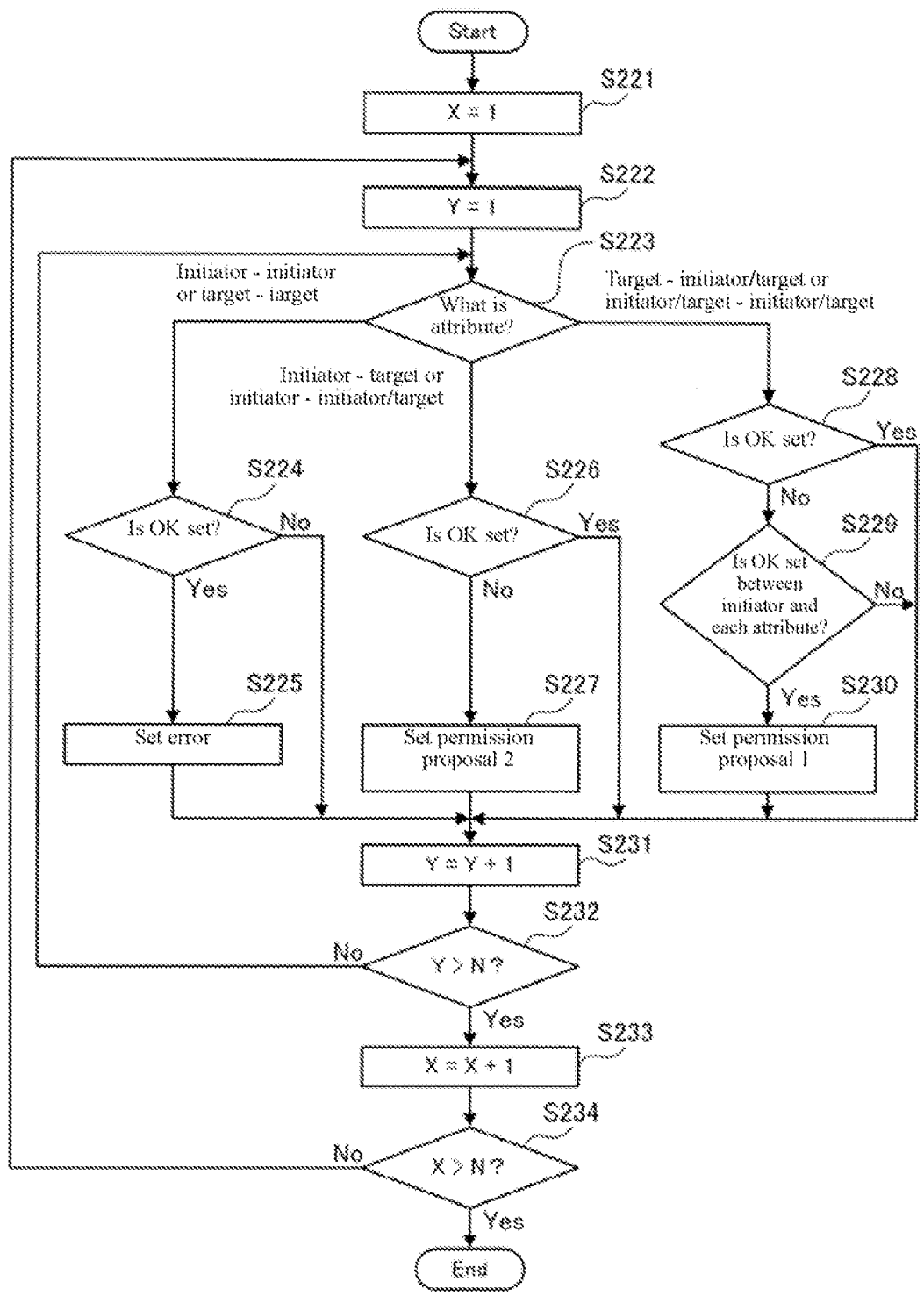
FIG. 6 is a flowchart showing the flow of the first operation example of the validity verification process according to the embodiment of the invention.

FIG. 6 is a flowchart showing the flow of the validity verification process in the first operation example.

First, the validity verification part 25 substitutes "1" into variable X representing the index in the longitudinal direction of the ZP table stored in the ZP table storage part 22 (step 221). And the subsequent process is performed while X is incremented one by one. Herein, when X is "1", "2" and "3", the process is performed taking notice of the first row, the second row and the third row from the top in the ZP table.

Next, the validity verification part 25 substitutes "1" into variable Y representing the index in the transverse direction of the ZP table stored in the ZP table storage part 22 (step 222). And the subsequent process is performed while Y is incremented one by one. Herein, when Y is "1", "2" and "3", the process is performed taking notice of the first column, the second column and the third column from the left in the ZP table.

A process taking notice of a cell in the Xth row from the top and the Yth column from the left (hereinafter denoted as a cell (X, Y)) in the ZP table will be described below.

The validity verification part 25 firstly discriminates the combination of the attribute of port for the SAS device in the Xth row from the top in the ZP table and the attribute of port for the SAS device in the Yth column from the left in the ZP table (step 223).

As a result, if it is determined that the combination of the attributes of port is initiator and initiator, or target and target, the validity verification part 25 determines whether or not "OK" is set in the cell (X,Y) (step 224). And if "OK" is set, an error is set in the message outputted to the user (step 225), because access between initiator and initiator or access between target and target is not permitted. Also, if "OK" is not set, an error is not set in the message outputted to the user and the following process is performed.

Also, if it is determined that the combination of the attributes of port is initiator and target, or initiator and initiator/target, the validity verification part 25 determines whether or not "OK" is set in the cell (X,Y) (step 226).

And if "OK" is not set, a permission proposal 2 is set in the message outputted to the user (step 227).

The permission proposal 2 is the proposal indicating that access between two SAS devices of notice may be permitted, with a lower priority than the permission proposal 1 as will be described later. That is, in making the permission proposal 2, it is considered that a message sentence with weak compelling power is used, or if there is another proposal, the weight is lowered, for example. It should be noted that the reason why the priority of the permission proposal 2 is lowered is that there is no need for always making the proposal because of the fundamental setting.

Also, if "OK" is set in the cell (X,Y), the permission proposal 2 is not set in the message outputted to the user and the following process is performed.

Further, if it is determined that the combination of the attributes of port is target and initiator/target, or initiator/target and initiator/target, the validity verification part 25 determines whether or not "OK" is set in the cell (X,Y) (step 228). As a result, if "OK" is not set, it is determined whether or not "OK" is set in the cell corresponding to one SAS device included in the combination noticed here and the SAS device functioning as the initiator, and "OK" is set in the cell corresponding to another SAS device included in the combination noticed here and the SAS device functioning as the initiator (step 229).

And if "OK" is set in these cells, the permission proposal 1 is set in the message outputted to the user (step 230). For example, the combination of SAS devices of notice is Disk1 and Disk2 in cell (2,3) of FIG. 5(a). And "OK" is set in Disk1 that is one SAS device included in this combination and Blade1 that is SAS device functioning as the initiator and "OK" is set in Disk2 that is another SAS device included in this combination and Blade1 that is the SAS device functioning as the initiator, whereby the permission proposal 1 is set.

The permission proposal 1 is the proposal indicating that access between two SAS devices of notice may be permitted, with a higher priority than the permission proposal 2 as previously described. That is, in making the permission proposal 1, it is considered that a message sentence with strong compelling power is used, or if there is another proposal, the weight is raised, for example. It should be noted that the reason why the priority of the permission proposal 1 is raised is that there is possibility that a special function such as backup agent may be provided in the port of object.

Also, if it is determined at step 228 that "OK" is set, or it is determined at step 229 that "OK" is not set, the permission proposal 1 is not set in the message outputted to the user and the following process is performed.

Thereafter, the validity verification part 25 adds "1" to Y (step 231), and determines whether or not Y exceeds the total number N of SAS devices included in the ZP table (step 232). And if Y does not exceed the total number N of SAS devices, the operation goes to step 223.

Also, if Y exceeds the total number N of SAS devices, the validity verification part 25 adds "1" to X (step 233), and determines whether or not X exceeds the total number N of SAS devices (step 234). And if X does not exceed the total number N of SAS devices, the operation goes to step 222. Also, if X exceeds the total number N of SAS devices, the process is ended.

In the flowchart of FIG. 6, the process where X=Y, namely, the process for the cell corresponding to the row and column in which the same SAS device is set is not referred to. However, if nothing can be set in the cell corresponding to the row and column in which the same SAS device is set in the ZP table, the process where X=Y may be skipped.

Also, in the flowchart of FIG. 6, in the case where the combination of the attributes of port is initiator and target, or initiator and initiator/target, the permission proposal 2 is set if "OK" is set. However, even in the case where the combination of the attributes of port is initiator/target and target, or initiator/target and initiator/target, the permission proposal 2 may be set if "OK" is set.

In a second operation example, the operations of the zone manager module 20 is similar to the operations shown in FIG. 3.

However, the second operation example is different from the first operation example in that the ZP table with information set for each ZGID is generated at step 202, and the I/T table with information set for each ZGID is generated at step 204, although the ZP table and the I/T table with information set for each SAS device are generated in the first operation example.

Also, for the second operation example, the validity verification process by the validity verification part 25 at step 205 is different from the first operation example.

The second operation example is different from the first operation example in that the permission verification process for verifying whether to make the permission proposal is performed for the setting between each ZGID, although the permission verification process for verifying whether to make the permission proposal is performed for the setting between each port. That is, in this first operation example, the user may perform the zoning by narrowing the object only to the intuitive ID relevance such as a set relationship between Blade and Disk.

Further, the second operation example is different from the first operation example in that a division verification process for verifying whether to make the division proposal is performed. That is, in the case where only some of the ports included in a certain ZGID cannot become the initiator or the target, a policy of not permitting the classification of ports into the ZGID is taken, thereby proposing to the user that some of the ports are separated from the ZGID.

Furthermore, the second operation example is different from the first operation example in that a merge verification process for verifying whether to make the merge proposal is performed. That is, it is supposed that for a certain initiator, access to a certain target is permitted and access to another target is also permitted. In this case, if two targets cannot become the initiator, it is notified that these targets can be merged into one ZGID, because these targets are included in the same ZGID without influence.

In an execution sequence of the permission verification process, the division verification process and the merge verification process is not specifically limited, but they are preferably performed in the sequence of the division verification process, the merge verification process and the permission verification process. Accordingly, the process in accordance with the flowchart of FIG. 3 in this sequence will be specifically described below.

The division verification process will be described below.

FIG. 7 is a view showing the examples of the table generated in this case.

First, the user sets the ZP table, and the ZP table generation part 21 stores the ZP table in the ZP table storage part 22 at step 202. The user may set the ZP table as shown in FIG. 7(a). In the second operation example, unlike the first operation example, ZGID that is identification information of the zone group is set in the row and column of the ZP table. It should be noted that "OK" in the table indicates that access between corresponding ZGIDs is permitted.

In the second operation example, a ZGID table defining the correspondence between ZGID and SAS device is also stored in a memory, not shown. The ZGID table as shown in FIG. 7(b) may be stored. This ZGID table may be set in advance by the user.

Also, the I/T table generation part 23 creates the I/T table and stores it in the I/T table storage part 24 at step 204. The I/T table as shown in FIG. 7(c) is created in this example. In this case, the attributes of ports for Blade1-3, Disk1-3 of the storage module 1 and the RAID controller associated with ZGID1 in the ZGID table of FIG. 7(b) are initiator, target and initiator/target, respectively. Accordingly, the attribute of ZGID1 is initiator/target. Also, since the attribute of port for Blade4-6 associated with ZGID2 is initiator, the attribute of ZGID2 is initiator. Further, since the attribute of port for Disk4-6 of storage module 1 associated with ZGID3 and the attribute of port for Disk 1-6 of storage module 2 associated with ZGID4 are target, the attributes of ZGID3 and ZGID4 are both target.

Thereafter, the validity verification part 25 verifies whether or not division is required based on the ZGID table as shown in FIG. 7(b) and the attribute of port included in ZGID at step 205. In this example, since Blade1-3 cannot become target, the division is proposed. Also, since Disk1-3 of the storage module 1 cannot become initiator, the division is proposed. And the ZGID table as shown in FIG. 7(d) is finally generated. That is, ZGID1 in the ZGID table of FIG. 7(b) is divided into ZGID1 including Blade1-3, ZGID5 including Disk1-3 of the storage module 1 and ZGID6 including the RAID controller.

Next, the division verification process by the validity verification part 25 at step 205 will be described below in detail.

Figure 8:
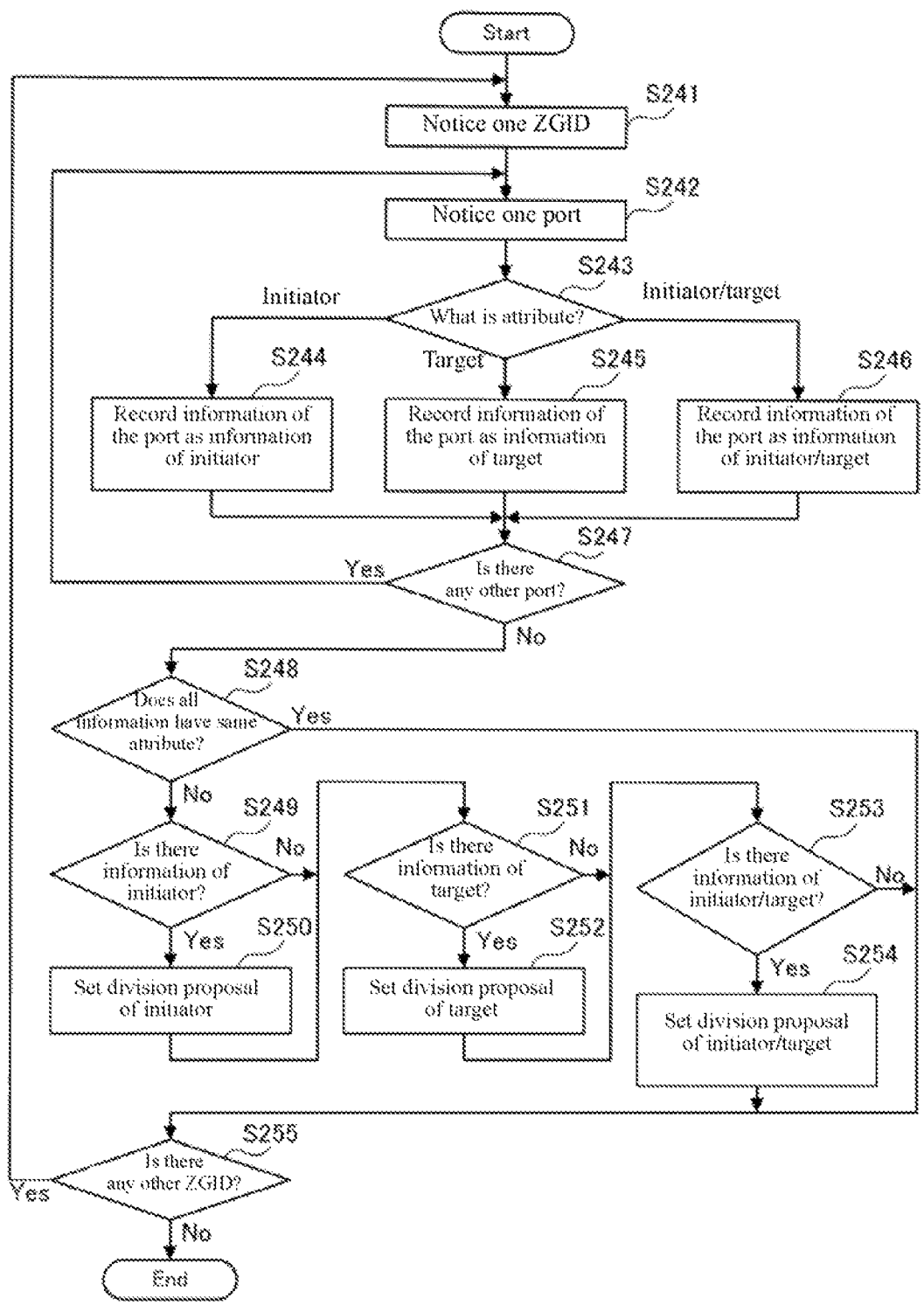
FIG. 8 is a flowchart showing the flow of the division verification process in the second operation example of the validity verification process according to the embodiment of the invention.

FIG. 8 is a flowchart showing an operation example of the validity verification part 25 in this case.

First, the validity verification part 25 takes notice of one ZGID in the ZGID table (step 241). And it takes notice of one port associated with this ZGID in the ZGID table (step 242).

Then, the validity verification part 25 discriminates the attribute of port (step 243).

As a result, if it is determined that the attribute of port is initiator, the validity verification part 25 records information of the port as information of initiator (step 244). For example, a memory, not shown, is divided into an area for initiator, an area for target and an area for application/target, and the information of the port is recorded in the area for initiator.

Also, if it is determined that the attribute of a port is target, the validity verification part 25 records information of the port as information of target (step 245). For example, the memory, not shown, is divided into an area for initiator, an area for target and an area for application/target, and the information of the port is recorded in the area for target.

Further, if it is determined that the attribute of port is initiator/target, the validity verification part 25 records information of the port as information of initiator/target (step 246). For example, the memory, not shown, is divided into an area for initiator, an area for target and an area for application/target, and the information of the port is recorded in the area for initiator/target.

Thereafter, the validity verification part 25 determines whether or not there is any other port associated with ZGID noticed in the ZGID table (step 247). And if there is any other port, the operation goes to step 242.

Also, if there is no other port, it is determined whether or not all the information recorded at steps 244 to 246 is recorded as information with the same attribute (step 248).

As a result, if all the information is recorded as information with the same attribute, the operation goes to step 255 without performing the process for division proposal. For example, if all the attributes of ports included in one ZGID are initiator, target or initiator/target, it is unnecessary to make the division proposal.

In the other hand, if all the information is not recorded as information with the same attribute, the validity verification part 25 determines whether or not there is the information of port recorded as information of initiator (step 249). And if there is information of port recorded as information of initiator, the division proposal of initiator is set in the message outputted to the user (step 250). Also, if there is no information of port recorded as information of initiator, the division proposal of initiator is not set in the message outputted to the user and the operation goes to the following step.

Next, the validity verification part 25 determines whether or not there is information of port recorded as information of target (step 251). And if there is information of port recorded as information of target, the division proposal of target is set in the message outputted to the user (step 252). Also, if there is no information of port recorded as information of target, the division proposal of target is not set in the message outputted to the user and the operation goes to the following step.

Next, the validity verification part 25 determines whether or not there is information of port recorded as information of initiator/target (step 253). And if there is information of port recorded as information of initiator/target, the division proposal of initiator/target is set in the message outputted to the user (step 254). Also, if there is no information of port recorded as information of initiator/target, the division proposal of initiator/target is not set in the message outputted to the user and the operation goes to the following step.

Thereafter, the validity verification part 25 determines whether or not there is any other ZGID in the ZGID table (step 255). And if there is any other ZGID, the operation goes to step 241. Also, if there is no other ZGID, the process is ended.

Next, the merge verification process will be described below.

FIG. 9 is a view showing the examples of the table generated in this case.

First, the user sets the ZP table, and the ZP table generation part 21 stores the ZP table in the ZP table storage part 22 at step 202. The user may set the ZP table as shown in FIG. 9(*a*). In the second operation example, unlike the first operation example, ZGID that is identification information of the zone group is set in the row and column of the ZP table. It should be noted that "OK" in the table indicates that access between corresponding ZGIDs is permitted.

In the second operation example, a ZGID table defining the correspondence between ZGID and SAS device is also stored in the memory, not shown. The ZGID table as shown in FIG. 9(*b*) is stored.

And the I/T table generation part 23 creates the I/T table and stores it in the I/T table storage part 24 at step 204. The I/T table as shown in FIG. 9(*c*) is created in this example. In this case, since the attributes of ports for Blade 1-3 associated with ZGID1 and Blade 4-6 associated with ZGID2 in the ZGID table of FIG. 9(*b*) are initiator, the attributes of ZGID1 and ZGID2 are both initiator. Also, since the attribute of port for Disk1-6 of the storage module 1 associated with ZGID3 and the attribute of port for Disk1-6 of the storage module 2 associated with ZGID4 are target, the attributes of ZGID3 and ZGID4 are both target.

Thereafter, the validity verification part 25 verifies whether or not the merge is required based on the ZP table as shown in FIG. 9(*a*) and the I/T table as shown in FIG. 9(*c*) at step 205. In this example, access between ZGID1 that is initiator and ZGID3 and ZGID4 that are target is permitted, and access between ZGID2 that is initiator and ZGID3 and ZGID4 that are target is also permitted. Accordingly, since there is no influence even if ZGID1 and ZGID2 are treated as one ZGID, a merge proposal for these ZGIDs is made. Also, access between ZGID3 that is target and ZGID1 and ZGID2 that are initiator is permitted, and access between ZGID4 that is target and ZGID1 and ZGID2 that are initiator is also permitted. Accordingly, since there is no influence even if ZGID3 and ZGID4 are treated as one ZGID, a merge proposal for these ZGIDs is made.

Next, the merge verification process by the validity verification part 25 at step 205 will be described below in detail.

Figure 10:
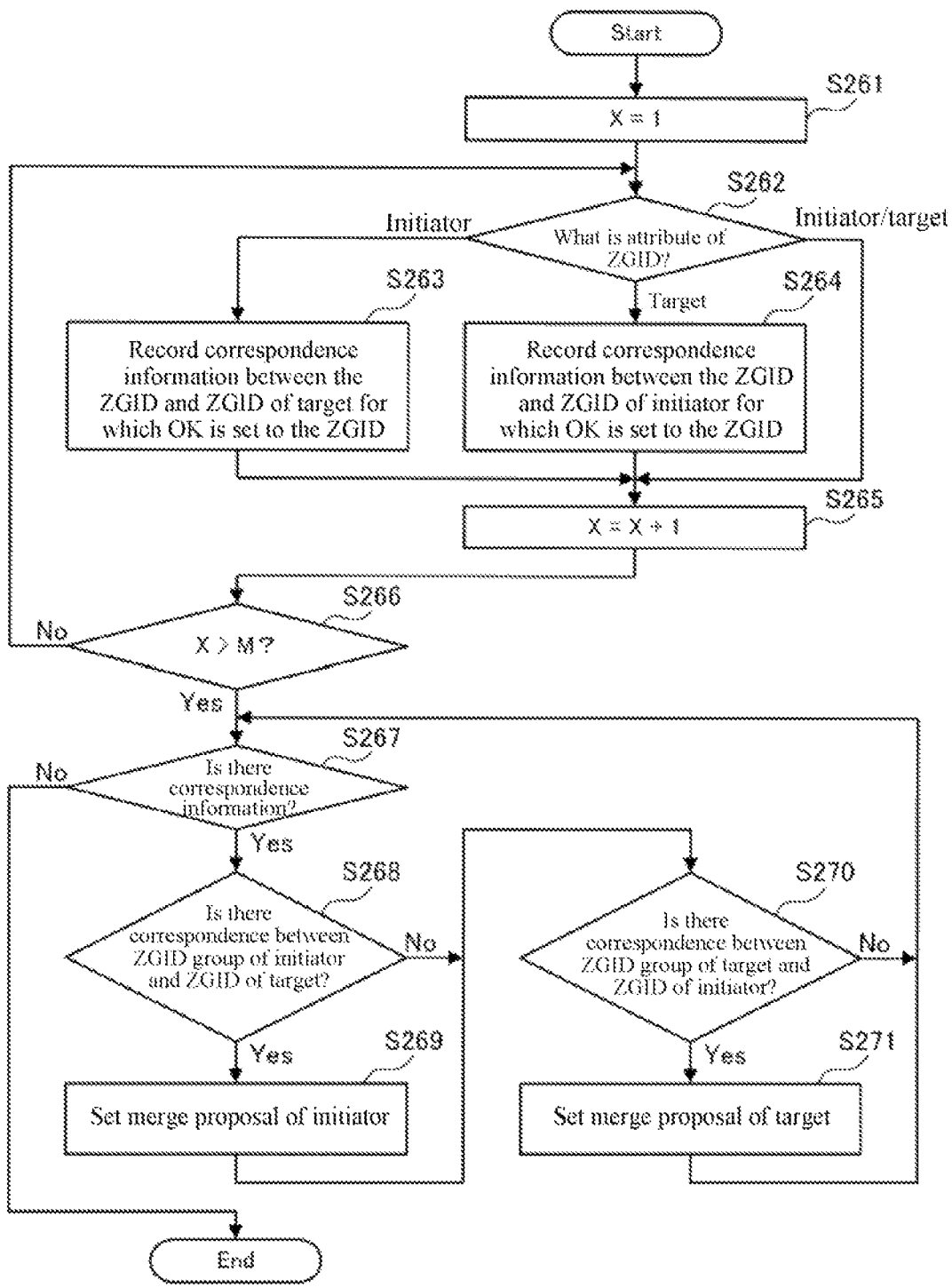
FIG. 10 is a flowchart showing the flow of the merge verification process in the second operation example of the validity verification process according to the embodiment of the invention.

FIG. 10 is a flowchart showing an operation example of the validity verification part 25 in this case.

First, the validity verification part 25 substitutes "1" into variable X representing the index in the longitudinal direction of the ZP table stored in the ZP table storage part 22 (step 261). And the subsequent process is performed while X is incremented one by one. When X is "1", "2" and "3", the process is performed taking notice of the first row, the second row and the third row from the top in the ZP table.

Next, a process considering the Xth row from the top in the ZP table will be described below.

The validity verification part 25 firstly discriminates the attribute of ZGID in the Xth row from the top in the ZP table (step 262).

As a result, if it is determined that the attribute of ZGID is initiator, the validity verification part 25 records the correspondence information between the ZGID of initiator and the ZGID of target for which "OK" is set to the ZGID of initiator (step 263). For example, an area for the ZGID of initiator is provided in the memory, not shown, and the ZGID of target is recorded in the area. In the ZP table of FIG. 9(*a*), taking notice of ZGID1 that is initiator in the first row, "OK" is set to the cell corresponding to ZGID3 and ZGID4 that are target. Accordingly, information of ZGID3 and ZGID4 is recorded in the area for ZGID1. Also, for ZGID2 that is initiator in the second row, "OK" is set to the cell corresponding to ZGID3 and ZGID4 that are target. Accordingly, information of ZGID3 and ZGID4 is recorded in the area for ZGID2.

Also, if it is determined that the attributes of ZGID is target, the validity verification part 25 records the correspondence information between the ZGID of target and the ZGID of initiator for which "OK" is set to the ZGID of target (step 264). For example, an area for the ZGID of target is provided in the memory, not shown, and the ZGID of initiator is recorded in the area. In the ZP table of FIG. 9(*a*), taking notice of ZGID3 that is target in the third row, "OK" is set to the cell corresponding to ZGID1 and ZGID2 that are initiator. Accordingly, information of ZGID1 and ZGID2 is recorded in the area for ZGID3. Also, taking notice of ZGID4 that is initiator in the fourth row, "OK" is set to the cell corresponding to ZGID1 and ZGID2 that are initiator. Accordingly, information of ZGID1 and ZGID2 is recorded in the area for ZGID4.

Further, if it is determined that the attribute of ZGID is initiator/target, the validity verification part 25 does not record the correspondence information and the operation goes to the next step.

Thereafter, the validity Verification part 25 adds "1" to X (step 265), and determines whether or not X exceeds the total number M of ZGIDs included in the ZP table (step 266). And if X does not exceed the total number M of ZGIDs, the operation goes to step 262.

Also, if X exceeds the total number M of ZGIDs, the validity verification part 25 determines whether or not the correspondence information of ZGID is recorded in the memory (step 267).

As a result, if the correspondence information of ZGID is recorded, it is determined whether or not the correspondence information between plural ZGIDs that are initiator and one ZGID that is target exists in the correspondence information (step 268). And if there is such correspondence information, a merge proposal of initiator is set in the message outputted to the user (step 269). Also, if there is not such correspondence information, the merge proposal of initiator is not set in the message outputted to the user and the operation goes to the next step.

Next, the validity verification part 25 determines whether or not the correspondence information between plural ZGIDs that are target and one ZGID that is initiator exists in the correspondence information (step 270). And if there is such correspondence information, a merge proposal of target is set in the message outputted to the user (step 271). Also, if there is not such correspondence information, the merge proposal of target is not set in the message outputted to the user and the operation goes to step 267.

Thereafter, if the validity verification part 25 determines that the correspondence information of ZGID is not recorded in the memory, the process ends.

The permission verification process will be described below.

A case where the attribute of ZGID is initiator or target will be described below.

FIG. 11 is a view showing the examples of the table generated in this case.

First, the user sets the ZP table, and the ZP table generation part 21 stores the ZP table in the ZP table storage part 22 at step 202. The user may set the ZP table as shown in FIG. 11(a). In the second operation example, unlike the first operation example, ZGID that is identification information of the zone group is set in the row and column of the ZP table. It should be noted that "OK" in the table indicates that access between corresponding ZGIDs is permitted.

Also, the I/T table generation part 23 creates the I/T table and stores it in the I/T table storage part 24 at step 204. In this case, since the attribute of ZGID is initiator or target, the I/T table as shown in FIG. 11(b) is created. That is, the attributes of ZGID1 and ZGID2 are set as initiator, and the attributes of ZGID3 and ZGID4 are set as target.

Thereafter, the validity verification part 25 performs a validity verification process based on the ZP table as shown in FIG. 11(a) and the I/T table as shown in FIG. 11(b). In this validity verification process, information on accessibility to any other combination than the combination of ZGIDs to which the user sets "OK" in the ZP table can be automatically generated. Herein, since it is implicitly known that the data output destination of ZGID1 is ZGID3 and the data output destination of ZGID2 is ZGID4, with a server to disk configuration, from the I/T table of FIG. 11(b), the settings are unchanged as shown in FIG. 11(c).

Secondly, a case where the attribute of ZGID is initiator, target or initiator/target will be described below.

FIG. 12 is a view showing examples of the table generated in this case.

First, the user sets the ZP table, and the ZP table generation part 21 stores the ZP table in the ZP table storage part 22 at step 202. The user may set the ZP table as shown in FIG. 12(a). This is the same as shown in FIG. 11(a). It should be noted that "OK" in the table indicates that access between corresponding ZGIDs is permitted.

Also, the I/T table generation part 23 creates the I/T table and stores it in the I/T table storage part 24 at step 204. Since the attribute of ZGID is initiator, target or initiator/target in this example, the I/T table as shown in FIG. 12(b) is created. That is, the attributes of ZGID1 and ZGID2 are set as initiator, the attribute of ZGID3 is set as initiator/target, and the attribute of ZGID4 is set as target.

Thereafter, the validity verification part 25 performs a validity verification process based on the ZP table as shown in FIG. 12(a) and the I/T table as shown in FIG. 12(b) at step 205. In this validity verification process, information on accessibility to any other combination than the combination of ZGIDs to which the user sets "OK" in the ZP table can be automatically generated. ZGID3 can become initiator, and it is estimated that some backup agent is mounted on ZGID3. Also, because ZGID4 is only a target and a hard disk, it is used as the backup destination. There is a possibility that the target for the initiator of ZGID3 may be ZGID3 itself, or ZGID4, whereby it is possible to propose to the user that access to each is permitted to improve the performance.

The operation of the permission verification process by the validity verification part 25 at step 205 is equivalent to the operation performed by replacing port with ZGID in the description of the flowchart of FIG. 6.

As described above, in this embodiment, the validity of settings in the ZP table is verified using the attribute of port of the SAS device or the attribute of ZGID as the set thereof. A determination may be automatically made as to whether or not the settings in the ZP table by the user are appropriate. Particularly in the second operation example, the user may perform the zoning by narrowing the object only to the intuitive relevance of port such as the relationship between server and disk, and a proposal or warning for the candidate of optimal ZP table is automatically made, whereby the trouble or mistake of zoning by the user can be greatly reduced.

Also, the mergeable zone group can be automatically detected by referring to the attribute information of port for the SAS device or the ZP table.

Moreover, there may be automatic detection of a support for the system requiring access between the hard disks such as a serverless copy by using the attribute information of port (information that the port is initiator, target or initiator/target).

Though the invention has been described above with the above discussed embodiments, the technical scope of the invention is not limited to the above embodiment. It will be apparent to a person skilled in the art that various variations or modifications may be made without departing from the spirit or scope of the invention.

The invention claimed is:

1. A computer implemented method for managing zone information for devices in a network, comprising:
providing a zone table including entries indicating whether a plurality of devices are permitted to communicate and access each other over the network;
providing an attributes table having attributes of the devices indicated in the zone table, wherein the attributes indicate initiator and/or target;
determining attributes from the attributes table for devices indicated in the zone table entries as being permitted to communicate and access each other;
determining from the attributes table whether the devices indicated in the zone table have the initiator and/or target attribute;

verifying the entries in the zone table indicating that devices can communicate by determining whether the attributes for the devices indicated in the zone table as being permitted to communicate are consistent with the determined devices being able to communicate; and outputting information indicating whether the entries in the zone table indicating that devices can communicate are in error.

2. The method of claim 1, wherein the entries in the zone table indicate whether a first device can communicate with a second device for each of the devices represented in the zone table, and wherein the attributes in the attribute table indicate whether the devices indicated in the zone table are an initiator, a target or an initiator/target.

3. The method of claim 2, wherein the entries in the zone table indicated as permitting communication from the first device to the second device are verified as valid if the attributes table indicates that the first device is an initiator and the second device is a target.

4. The method of claim 2, further comprising:
determining, for the entries in the zone table indicating that communication is permitted from the first device to the second device, whether the attributes table indicates that the first device and the second device are both initiators or both targets; and
indicating an error in the output information for the entries in the zone table indicating that communication is permitted from the first device to the second device in response to determining that the attributes table indicates that the first device and the second device for the entries are both initiators or both targets.

5. The method of claim 2, further comprising:
determining, for the entries in the zone table indicating that communication is not permitted from the first device to the second device, whether the attributes table indicates one of: (1) that the first device is a target and the second device is an initiator/target, (2) that the first and second devices are the initiator/target, (3) that the first device is the initiator and the second device is the target, and (4) that the first device is the initiator and the second device is the initiator/target; and
indicating a permission proposal in the output information indicating that access between two devices is permitted for the devices in the entries in the zone table indicating that communication is not permitted from the first device to the second device in response to determining that the attributes table indicates one of: (1) that the first device is a target and the second device is an initiator/target, (2) that the first and second devices are the initiator/target, (3) that the first device is the initiator and the second device is the target, and (4) that the first device is the initiator and the second device is the initiator/target.

6. The method of claim 2, further comprising:
determining, for entries in the zone table indicating that communication is not permitted from the first device to the second device, whether the attributes table indicates one of: (1) that the first device is a target and the second device is an initiator/target, and (2) that the first and second devices are the initiator/target;
indicating a first permission proposal in the output information indicating that access is permitted for the devices in the entries in the zone table indicating that communication is not permitted from the first device to the second device in response to determining that the attributes table indicates one of: (1) that the first device is a target and the second device is an initiator/target, and (2) that the first and second devices are the initiator/target;

determining, for entries in the zone table indicating that communication is not permitted from the first device to the second device, whether the attributes table indicates one of: (1) that the first device is the initiator and the second device is the target, and (2) that the first device is the initiator and the second device is the initiator/target; and
indicating a second permission proposal in the output information indicating that access is permitted for the devices in the entries in the zone table indicating that communication is not permitted from the first device to the second device in response to determining that the attributes table indicates one of: (1) that the first device is the initiator and the second device is the target, and (2) that the first device is the initiator and the second device is the initiator/target.

7. The method of claim 6, wherein the first permission proposal indicates that access between the devices is permitted with higher priority than the second permission proposal.

8. The method of claim 1, further comprising:
receiving resetting information to correct validity errors indicated in the output information; and
updating the zone table with the resetting information to correct the validity errors.

9. A system for managing zone information for devices in a network, comprising:
a processor; and
a zone manager module executed by the processor to perform operations, the operations comprising:
providing a zone table including entries indicating whether a plurality of devices in at least one zone are permitted to communicate and access each other over the network;
providing an attributes table having attributes of the devices indicated in the zone table, wherein the attributes indicate initiator and/or target;
determining attributes from the attributes table for devices indicated in the zone table entries as being permitted to communicate and access each other;
determining from the attributes table whether the devices indicated in the zone table have the initiator and/or target attribute;
verifying the entries in the zone table indicating that devices can communicate by determining whether the attributes for the devices indicated in the zone table as being permitted to communicate are consistent with the determined devices being able to communicate; and
outputting information indicating whether the entries in the zone table indicating that devices can communicate are in error.

10. The system of claim 9, wherein the entries in the zone table indicate whether a first device can communicate with a second device for each of the devices represented in the zone table, and wherein the attributes in the attribute table indicate whether the devices indicated in the zone table are an initiator, a target or an initiator/target.

11. The system of claim 10, wherein the entries in the zone table indicated as permitting communication from the first device to the second device are verified as valid if the attributes table indicates that the first device is an initiator and the second device is a target.

12. The system of claim 10, wherein the operations further comprise:
determining, for the entries in the zone table indicating that communication is permitted from the first device to the second device, whether the attributes table indicates that the first device and the second device are both initiators or both targets; and indicating an error in the output information for the entries in the zone table indicating that communication is permitted from the first device to the second device in response to determining that the attributes table indicates that the first device and the second device for the entries are both initiators or both targets.

13. The system of claim 10, wherein the operations further comprise:

determining, for the entries in the zone table indicating that communication is not permitted from the first device to the second device, whether the attributes table indicates one of: (1) that the first device is a target and the second device is an initiator/target, (2) that the first and second devices are the initiator/target, (3) that the first device is the initiator and the second device is the target, and (4) that the first device is the initiator and the second device is the initiator/target; and indicating a permission proposal in the output information indicating that access between two devices is permitted for the devices in the entries in the zone table indicating that communication is not permitted from the first device to the second device in response to determining that the attributes table indicates one of: (1) that the first device is a target and the second device is an initiator/target, (2) that the first and second devices are the initiator/target, (3) that the first device is the initiator and the second device is the target, and (4) that the first device is the initiator and the second device is the initiator/target.

14. The system of claim 10, wherein the operations further comprise:

determining, for entries in the zone table indicating that communication is not permitted from the first device to the second device, whether the attributes table indicates one of: (1) that the first device is a target and the second device is an initiator/target, and (2) that the first and second devices are the initiator/target;

indicating a first permission proposal in the output information indicating that access is permitted for the devices in the entries in the zone table indicating that communication is not permitted from the first device to the second device in response to determining that the attributes table indicates one of: (1) that the first device is a target and the second device is an initiator/target, and (2) that the first and second devices are the initiator/target;

determining, for entries in the zone table indicating that communication is not permitted from the first device to the second device, whether the attributes table indicates one of: (1) that the first device is the initiator and the second device is the target, and (2) that the first device is the initiator and the second device is the initiator/target; and indicating a second permission proposal in the output information indicating that access is permitted for the devices in the entries in the zone table indicating that communication is not permitted from the first device to the second device in response to determining that the attributes table indicates one of: (1) that the first device is the initiator and the second device is the target, and (2) that the first device is the initiator and the second device is the initiator/target.

15. The system of claim 14, wherein the first permission proposal indicates that access between the devices is permitted with higher priority than the second permission proposal.

16. The system of claim 9, further comprising:

receiving resetting information to correct validity errors indicated in the output information; and updating the zone table with the resetting information to correct the validity errors.

17. A computer storage device including a zone manager module executed in a server system to manage zone information for devices in a network, comprising:

providing a zone table including entries indicating whether a plurality of devices are permitted to communicate and access each other over the network;

providing an attributes table having attributes of the devices indicated in the zone table, wherein the attributes indicate initiator and/or target;

determining attributes from the attributes table for devices indicated in the zone table entries as being permitted to communicate and access each other;

determining from the attributes table whether the devices indicated in the zone table have the initiator and/or target attribute;

verifying the entries in the zone table indicating that devices can communicate by determining whether the attributes for the devices indicated in the zone table as being permitted to communicate are consistent with the determined devices being able to communicate; and outputting information indicating whether the entries in the zone table indicating that devices can communicate are in error.

18. The computer storage device of claim 17, wherein the entries in the zone table indicate whether a first device can communicate with a second device for each of the devices represented in the zone table, and wherein the attributes in the attribute table indicate whether the devices indicated in the zone table are an initiator, a target or an initiator/target.

19. The computer storage device of claim 18, wherein the entries in the zone table indicated as permitting communication from the first device to the second device are verified as valid if the attributes table indicates that the first device is an initiator and the second device is a target.

20. The computer storage device of claim 18, wherein the operations further comprise:

determining, for the entries in the zone table indicating that communication is permitted from the first device to the second device, whether the attributes table indicates that the first device and the second device are both initiators or both targets; and indicating an error in the output information for the entries in the zone table indicating that communication is permitted from the first device to the second device in response to determining that the attributes table indicates that the first device and the second device for the entries are both initiators or both targets.

21. The computer storage device of claim 18, wherein the operations further comprise:

determining, for the entries in the zone table indicating that communication is not permitted from the first device to the second device, whether the attributes table indicates one of: (1) that the first device is a target and the second device is an initiator/target, (2) that the first and second devices are the initiator/target, (3) that the first device is the initiator and the second device is the target, and (4) that the first device is the initiator and the second device is the initiator/target; and indicating a permission proposal in the output information indicating that access between two devices is permitted for the devices in the entries in the zone table indicating that communication is not permitted from the first device to the second device in response to determining that the attributes table indicates one of: (1) that the first device is a target and the second device is an initiator/target, (2) that the first and second devices are the initiator/target, (3) that the first device is the initiator and the second device is the target, and (4) that the first device is the initiator and the second device is the initiator/target.

22. The computer storage device of claim 18, wherein the operations further comprise:
   determining, for entries in the zone table indicating that communication is not permitted from the first device to the second device, whether the attributes table indicates one of: (1) that the first device is a target and the second device is an initiator/target, and (2) that the first and second devices are the initiator/target;
   indicating a first permission proposal in the output information indicating that access is permitted for the devices in the entries in the zone table indicating that communication is not permitted from the first device to the second device in response to determining that the attributes table indicates one of: (1) that the first device is a target and the second device is an initiator/target, and (2) that the first and second devices are the initiator/target;
   determining, for entries in the zone table indicating that communication is not permitted from the first device to the second device, whether the attributes table indicates one of: (1) that the first device is the initiator and the second device is the target, and (2) that the first device is the initiator and the second device is the initiator/target; and
   indicating a second permission proposal in the output information indicating that access is permitted for the devices in the entries in the zone table indicating that communication is not permitted from the first device to the second device in response to determining that the attributes table indicates one of: (1) that the first device is the initiator and the second device is the target, and (2) that the first device is the initiator and the second device is the initiator/target.

23. The computer storage device of claim 22, wherein the first permission proposal indicates that access between the devices is permitted with higher priority than the second permission proposal.

24. The computer storage device of claim 17, wherein the operations further comprise:
   receiving resetting information to correct validity errors indicated in the output information; and
   updating the zone table with the resetting information to correct the validity errors.

* * * * *